(12) United States Patent
Notsu et al.

(10) Patent No.: US 10,328,656 B2
(45) Date of Patent: Jun. 25, 2019

(54) LAMINATED PLATE

(71) Applicant: AGC Inc., Chiyoda-ku (JP)

(72) Inventors: Keiji Notsu, Tokyo (JP); Shunsuke Sadakane, Tokyo (JP); Atsushi Nakano, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 147 days.

(21) Appl. No.: 15/228,605

(22) Filed: Aug. 4, 2016

(65) Prior Publication Data
US 2017/0036414 A1    Feb. 9, 2017

(51) Int. Cl.
   *B32B 3/02*            (2006.01)
   *B32B 17/06*          (2006.01)
   *B32B 17/10*          (2006.01)
   *B60J 1/00*            (2006.01)
   *B60J 1/17*            (2006.01)

(52) U.S. Cl.
CPC ............ *B32B 3/02* (2013.01); *B32B 17/06* (2013.01); *B32B 17/10293* (2013.01); *B32B 17/10633* (2013.01); *B32B 17/10761* (2013.01); *B32B 17/10788* (2013.01); *B32B 17/10908* (2013.01); *B60J 1/008* (2013.01); *B32B 2264/102* (2013.01); *B32B 2264/104* (2013.01); *B32B 2264/105* (2013.01); *B32B 2307/102* (2013.01); *B32B 2307/542* (2013.01); *B32B 2605/00* (2013.01); *B32B 2605/006* (2013.01); *B32B 2605/08* (2013.01); *B60J 1/17* (2013.01)

(58) Field of Classification Search
CPC ....... Y10T 428/31601; Y10T 428/3163; Y10T 428/24612; Y10T 428/24777; B32B 3/02; B32B 17/06; B32B 17/10; B32B 17/10293; B32B 17/10339; B32B 17/10348; B32B 17/10036; B60J 1/008; B60J 1/08; B60J 1/16
See application file for complete search history.

(56) References Cited

U.S. PATENT DOCUMENTS

| | | | |
|---|---|---|---|
| 6,086,983 A | 7/2000 | Yoshizawa | |
| 6,863,956 B1 * | 3/2005 | Nakajima | B29C 59/022 428/156 |
| 2014/0093702 A1 * | 4/2014 | Kitajima | C03B 40/033 428/174 |
| 2015/0202854 A1 * | 7/2015 | Tsuchiya | C03C 3/087 428/179 |

FOREIGN PATENT DOCUMENTS

JP      11-60293      3/1999

\* cited by examiner

*Primary Examiner* — Joanna Pleszczynska
(74) *Attorney, Agent, or Firm* — Oblon, McClelland, Maier & Neustadt, L.L.P.

(57) ABSTRACT

The present invention relates to a laminated plate (laminated glass plate 102 for a vehicle) including a first plate (first glass plate 201) being curved in a first curved shape, a second plate (second glass plate 202) having a second shape that is different from the first curved shape, and an intermediate film 301 bonding the first plate and the second plate, in which the laminated plate has, in a planar view thereof, a peripheral region 313 and an in-plane region 314, and the peripheral region 313 has a flat region 313a and an undulating region 313b.

16 Claims, 8 Drawing Sheets

LAMINATED PLATE

FIELD OF THE INVENTION

The present invention relates to a laminated plate and an intermediate film.

BACKGROUND OF THE INVENTION

As a laminated plate formed by laminating two plates, for example, laminated glass plate for a vehicle has been known that is formed by laminating two glass plates having respective different radii of curvatures (curved shapes), so that surfaces of these glass plates are firmly adhered to each other via an intermediate film (for example, see Patent Document 1).

Such a laminated glass plate is in a state where one of the two glass plates is elastically deformed, or the two glass plates are mutually elastically deformed.

Patent Document 1 discloses glass plates that are prevented from being peeled off each other. The glass plates are formed by laminating a pair of glass plates such that, if their edges are laminated, a middle portion is opened, so that the glass plates do not firmly adhere to each other; while if the glass plates are bent, their respective surfaces are firmly adhered to each other, so that a force that presses the glass plates against each other is applied to peripheral portions of the glass plates, whereby the glass plates are prevented from being peeled off each other.

Patent Document 1: JP-A-11-060293

SUMMARY OF THE INVENTION

The present inventors have found that, in particular, a laminated plate that is formed by laminating two plates having respective different shapes may readily get wrinkles all over the outer periphery thereof, and there is a high possibility of problems to occur in point of function, strength, appearance quality, etc.

The present invention provides a laminated plate having solved the problems of function, strength and appearance quality, and provides an intermediate film for producing the laminated plate.

The present invention relates to a laminated plate including: a first plate being curved in a first curved shape; a second plate having a second shape, the second shape being different from the first curved shape; and an intermediate film bonding the first plate and the second plate, in which the laminated plate has, in a planar view thereof, a peripheral region and an in-plane region, and the peripheral region has a flat region and an undulating region.

According to the present invention, there is provided a laminated plate that is formed by laminating two plates having respective different shapes so that their surfaces are closely adhere to each other via an intermediate layer, which solves problems of function, strength, appearance quality, etc.

DETAILED DESCRIPTION OF THE INVENTION

Figure 1:
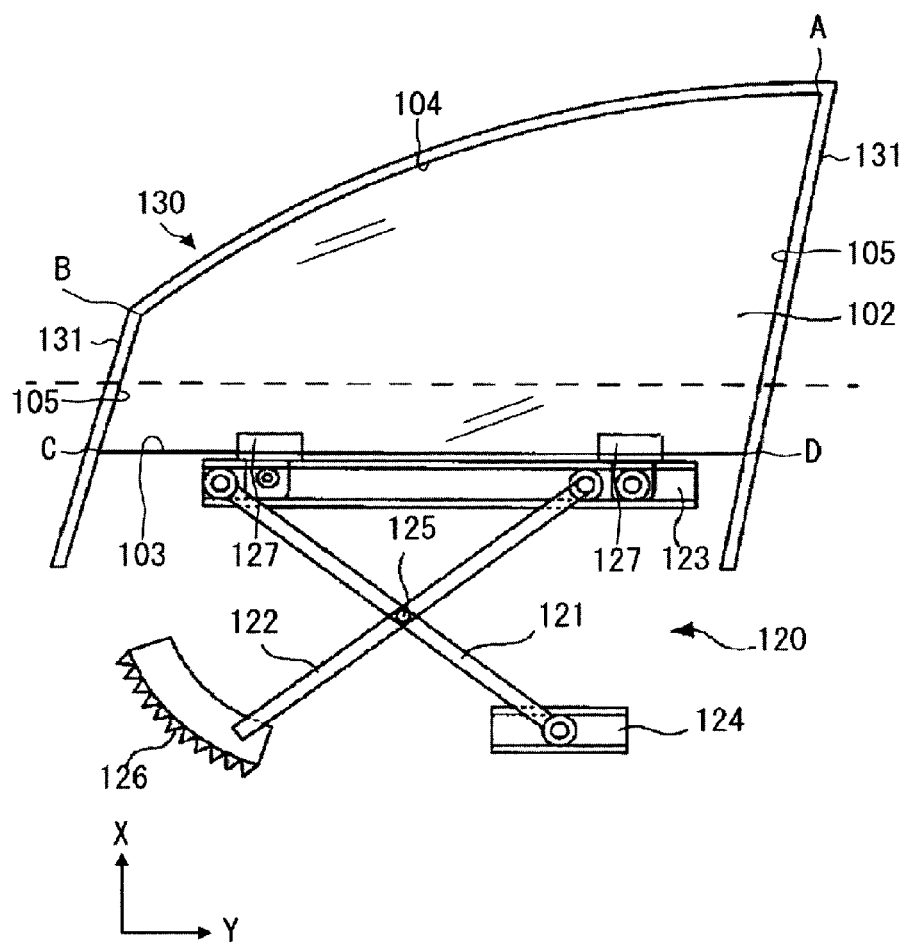
FIG. 1 is a configuration diagram illustrating a state in which a slidable laminated glass plate for a vehicle is assembled in a vehicle.

A specific example of a laminated plate according to an embodiment of the present invention is described below by referring to the accompanying drawings.

Note that, in some figures for describing the embodiment, coordinates are defined by arrows at lower left portions of the figures, and the embodiment is described by using these coordinates, depending on necessity. Additionally, in this specification, "X-direction" refers not only to a direction from an origin toward a tip of the arrow representing the X coordinate, but also to a direction from the tip toward the origin, which is reversed by 180 degrees. Similarly, "Y-direction" refers not only to a direction from an origin toward a tip of the arrow representing the Y coordinate, but also to a direction from the tip toward the origin, which is reversed by 180 degrees; and "Z direction" refers not only to a direction from an origin toward a tip of the arrow representing the Z coordinate, but also to a direction from the tip toward the origin, which is reversed by 180 degrees. Note that the X-direction may also be referred to as a first direction, and that the Y-direction may also be referred to as a second direction.

In addition, in this specification, each of the terms, such as "parallel" and "perpendicular" allows a deviation to an extent that an effect of the embodiment of the present invention is not lost. For example, an error to the extent of ±5° is allowed with respect to, as references, a strictly parallel positional relationship and a strictly perpendicular positional relationship.

Additionally, in this specification, it is assumed that vertical and horizontal directions represent the corresponding directions in the referred figure, unless specified as otherwise, and that the figure is viewed in the orientation with which the reference numerals can be correctly read.

In this specification, for a case of laminated glass plate, a slidable windowpane for a vehicle such as vertically slidable laminated glass plate for a vehicle is specifically described below, as a typical example of a laminated plate. However, the laminated plate is not limited to the slidable windowpane for a vehicle. For example, the laminated plate may be a windowpane for a vehicle that is to be adopted for a fixed window, such as a windshield and roof glass of a vehicle.

Additionally, the laminated plate is not limited to laminated glass plate. For example, the laminated plate may be formed by laminating resin plates, such as polycarbonate plates, or a laminated plate formed of a combination of a pillar of a body of a vehicle and a style strip that is laminated on the pillar, so that the style strip covers the pillar.

FIG. 1 is a configuration diagram illustrating a state where a slidable laminated glass plate (laminated plate) 102 for a vehicle according to the embodiment of the present invention is assembled for a vehicle.

In this embodiment, the laminate glass plate 102 for a vehicle that is a slidable windowpane for a vehicle is to be installed in a side door of a vehicle, and the laminated glass plate 102 is to be moved up and down along a window frame 130 by an elevator 120. In particular, portions of the window frame 130 that support side edges of the laminated glass plate 102 for a vehicle may also be referred to as glass runs 131. The elevator 120 is an arm type regulator, and the elevator 120 is formed of, for example, two arms 121 and 122; an elevation rail 123; a fixed rail 124; and a regulator. Here, the dashed line in the figure schematically illustrates a position of a lower end of the opening (a belt line) of a door of a vehicle.

The two arms 121 and 122 are mutually connected, so that the two arms 121 and 122 can pivot around a fulcrum 125, such as a shaft. The elevation rail 123 extends in the horizontal direction, and the elevation rail 123 can move up and down with respect to the door of the vehicle. Both upper ends of the arms 121 and 122 are attached to the elevation rail 123, so that the upper ends of the arms 121 and 122 can be slid in the horizontal direction. The fixed rail 124 also extends in the horizontal direction, and the fixed rail 124 is fixed with respect to the door of the vehicle. A lower end of the arm 121 is attached to the fixed rail 124, so that the lower end of the arm 121 can be slid in the horizontal direction; and a lower end of the arm 122 is connected to the regulator through a gear 126. In such a configuration, upon the gear 126 being driven through the regulator, the elevation rail 123 moves up and down, as the arms 121 and 122 pivot around the fulcrum 125, such as the shaft.

Holders 127 are attached to a lower edge 103 of the laminated glass plate 102 for a vehicle, and the holders 127 are assembled to the elevation rail 123 of the elevator 120.

In such a state, during opening and closing of the window by vertically sliding the laminated glass plate 102 for a vehicle, the upper edge 104 of the laminated glass plate 102 for a vehicle, which extends between the corner edge A and the corner edge B thereof, is an exposed edge that is exposed when the laminated glass plate 102 is opened. The exposed upper edge (exposed edge) 104 is a part through which a passenger watches the outside in many cases, and must secure predetermined transparency. In addition, a part of a body such as an elbow or the like or any other substance may often touch the upper edge (exposed edge) 104, and some foreign materials may be caught in closing a window, and therefore the upper edge 104 must secure predetermined strength. Further, the upper edge 104 is, as being exposed out, brought into public exposure and therefore must secure predetermined appearance quality.

Side edges 105 of the laminated glass plate 102 for a vehicle slide, each extending between the corner edge B and the corner edge C or between the corner edge A and the corner edge D, are slide edges sliding against respective glass runs 131 during up and down movement of the laminated glass plate 102. In addition, the side edges 105 are also parts through which a passenger may watch the outside as the case may be, and may be brought into public exposure in many cases. Further, some foreign materials such as sand, small stones and the like may be caught between the side edge 105 and the glass run 131 in many cases, and therefore the side edges 105 must secure predetermined strength.

Furthermore, the lower edge 103 extending between the corner edge C and the corner edge D of the laminated glass plate 102 for a vehicle is attached to the elevator 120 which is a power source of sliding, and is a non-exposed edge that is not exposed out. The lower edge 103 is not a part through which a passenger may watch the outside and is hardly brought into public exposure. A situation where any foreign material would collide against the lower edge 103 could hardly be expected.

In that manner, in the outer periphery of the laminated glass plate 102 for a vehicle, which includes the upper edge 104, the side edges 105 and the lower edge 103, the respective regions of the outer periphery thereof differ in point of the necessary function such as transparency or the like, and of the necessary strength and the appearance quality level. In the example of this embodiment, the part of the upper edge (exposed edge) 104 and the parts of the side edges (slide edges) 105 are required to have transparency, strength and appearance quality each on a predetermined level or more, while the part of the lower edge (non-exposed edge) 103, is not so much required to have high-level transparency, strength and appearance quality as compared with the upper edge 104 and the side edges 105.

Figure 2:
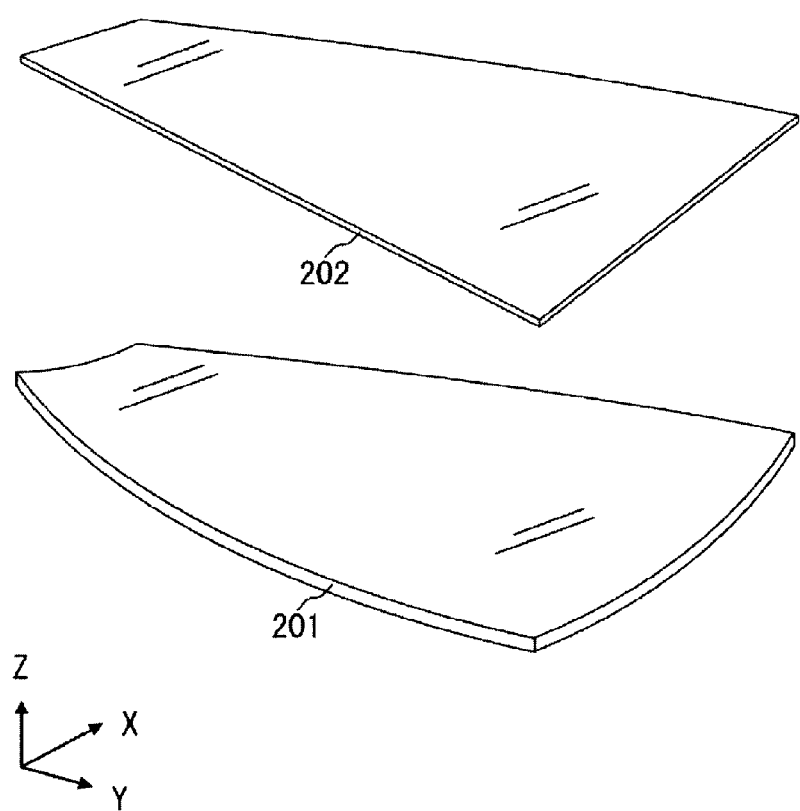
FIG. 2 is a diagram of a first glass plate and a second glass plate prior to lamination.
Figure 3:
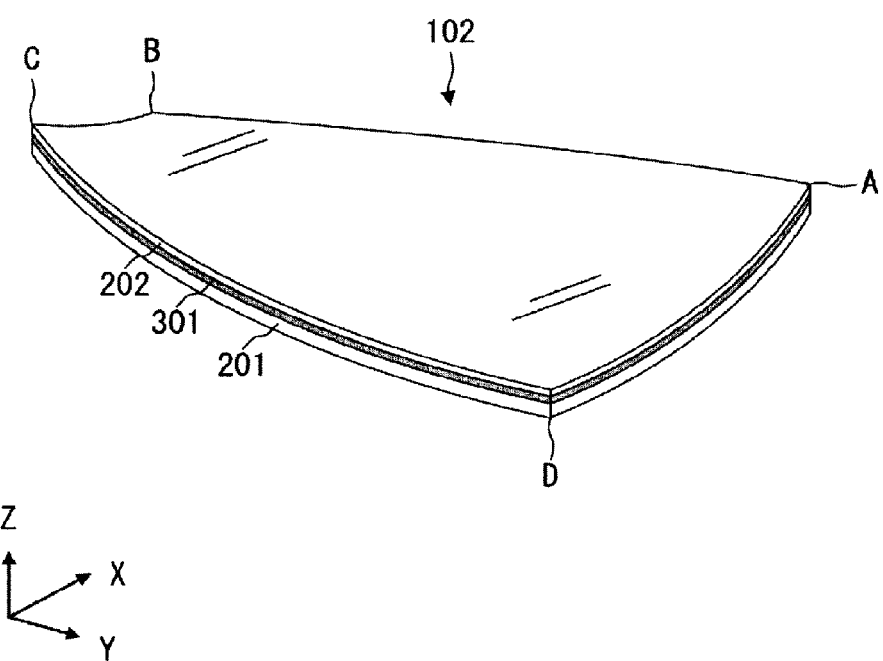
FIG. 3 is a perspective view of a laminated glass plate for a vehicle according to an embodiment of the present invention.
Figure 4:
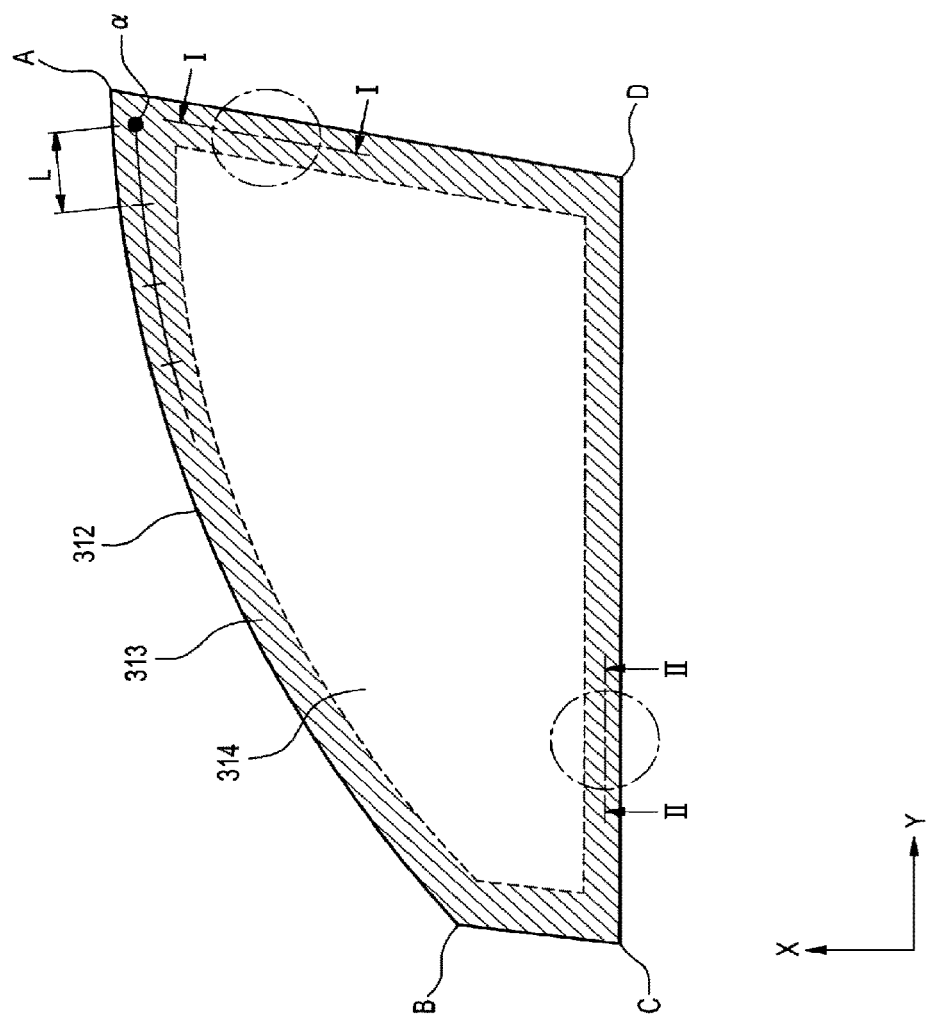
FIG. 4 is a plane view of the laminated glass plate for a vehicle according to the embodiment of the present invention.

FIG. 2 is a diagram of the first glass plate and the second glass plate prior to lamination. FIG. 3 is a perspective view of the laminated glass plate 102 for a vehicle according to this embodiment. FIG. 4 is a plane view of the laminated glass plate 102 for a vehicle according to this embodiment.

The laminated glass plate 102 for a vehicle according to this embodiment includes a first glass plate (first plate) 201 that is curved in a first curved shape; and a second glass plate (second plate) 202 that has a second shape that is different from the first curved shape, and these are bonded by an intermediate film 301.

The thickness of the first glass plate 201 is preferably 1.5 mm or more and 4.0 mm or less, and the thickness of the second glass plate 202 is preferably 0.2 mm or more and less than 1.0 mm. In that manner, the thickness of the first glass plate 201 is larger than that of the second glass plate 202. Accordingly, when the two are laminated, an amount of elastic deformation of the first glass plate 201 can be made smaller than an amount of elastic deformation of the second glass plate 202. Namely, by molding, in advance, the first glass plate 201 to have a curved shape to be assembled to a body of a vehicle, upon using as the laminated glass plate 102 for a vehicle, a deviation from the curved shape to be assembled to the body of the vehicle can be reduced.

Further, by setting the thickness of the first glass plate 201 to be greater than the thickness of the second glass plate 202, the stiffness required as the laminated glass plate 102 for a vehicle can be obtained by the first glass plate 201, while reducing the thickness of the second glass plate 202. In this manner, the weight of the laminated glass plate 102 for a vehicle can be reduced.

The thickness of the first glass plate 201 is more preferably 1.8 mm or more and 3.5 mm or less, even more preferably 2.0 mm or more and 3.0 mm or less.

The thickness of the second glass plate 202 is more preferably 0.2 mm or more and 0.9 mm or less, even more preferably 0.3 mm or more and 0.8 mm or less.

The ratio of the thickness of the first glass plate 201 to the thickness of the second glass plate 202 is preferably 0.1 or more and 0.5 or less, more preferably 0.15 or more and 0.4 or less.

Upon forming the laminated glass plate 102 for a vehicle, the area of the second glass plate 202 may be smaller than the area of the first glass plate 201.

For example, in the entire circumference of the laminated glass plate 102 for a vehicle, the peripheral edge of the second glass plate 202 may exist inside the peripheral edge of the first glass plate 201.

Alternatively, only a part of the peripheral edge of the second glass plate 202, such as only the lower edge 103, may exist inside the peripheral edge of the first glass plate 201.

Alternatively, only a part of the edge of the peripheral edge of the second glass plate 202, such as the portion where the holder 127 is installed, may exist inside the peripheral edge of the first glass plate 201.

In this manner, by disposing the peripheral edge of the second glass plate 202 inside the peripheral edge of the first glass plate 201, the laminated glass plate 102 for a vehicle can be configured such that, upon external force being applied to the laminated glass plate 102 for a vehicle, the external force is hardly applied to the edge of the second glass plate 202, which has a thickness that is less than the thickness of the first glass plate 201, and which has a strength that is less than the strength of the first glass plate 201. Namely, the edge strength of the laminated glass plate 102 for a vehicle can be enhanced.

In FIG. 2 and FIG. 3, the first curved shape is a multi-curved shape such that the first curved shape is curved both in the first direction (e.g., the X-direction) and in the second direction (e.g., the Y-direction), which is perpendicular to the X-direction.

By designing the first curved shape to be such a multi-curved shape, a superior-design window glass for a vehicle can be made, so that various design needs for vehicle design can be satisfied.

Especially, in usual laminated glass plate that is formed by laminating two glass plate having different curved shapes, so that the two glass plates are firmly adhere to each other through an intermediate film, if the first curved shape is a multi-curved shape, upon using the laminated glass plate as the laminated glass plate 102 for a vehicle, the entire outer periphery thereof is readily wrinkled. In contrast, according to this embodiment, wrinkles are concentrated in an intended area to be an undulating region while the other region is made to be a flat region, thereby solving the problems of function, strength and appearance quality. For example, the edge strength at the corner edges where the edge strength is often lowered can be increased. The details are described hereinunder.

However, the first curved shape is not limited to the shape disclosed in this embodiment. For example, the first curved shape may be a single-curved shape (a cylindrical shape) that is curved in the X-direction alone.

In FIG. 2 and FIG. 3, a case is illustrated where the second glass plate 202 has a flat plate shape, which is not curved. However, the shape of the second glass plate 202 is not limited to the shape disclosed in this embodiment. The second glass plate 202 may be curved only in the X-direction or in the Y-direction, or may be curved both in the X-direction and in the Y-direction.

Specifically, the second shape may be any shape as long as it is different from the first curved shape and includes a plate-like shape.

In this embodiment, in a case where the second glass plate 202 is curved in the X-direction and/or in the Y-direction and the second glass plate 202 has a radius of curvature that is close to the radius of curvature of the first curved shape, an amount of elastic deformation of the second glass plate 202 is small. Accordingly, when such a second glass plate 202 is used for the laminated glass plate 102 for a vehicle, the edge strength can be enhanced.

Especially, when the first curved shape is the multi-curved shape, and when, even only in any one of the X-direction and the Y-direction in which a radius of curvature is small, the second glass plate 202 is curved to have a radius of curvature that is close to the radius of curvature of the first curved shape, an amount of elastic deformation of the second glass plate is small for a case where such a second glass plate is used for the laminated glass plate 102 for a vehicle. Accordingly, in such a case, the edge strength can be enhanced.

A laminated glass plate where two glass plates differing in the curved shape are bonded so that their surfaces are firmly adhered to each other via an intermediate film, like in this embodiment, has pressure bonding-caused bending stress. In particular, in the case where the thickness of the second glass plate 202 is smaller than that of the first glass plate 201, the two glass plates are bonded mainly owing to the elastic deformation of the second glass plate 202, and therefore in the case, the second glass plate 202 has pressure bonding-cased bending stress. In the peripheral region of the second glass plate 202, pressure bonding-caused bending stress is formed, and at the center of the in-plane region of the second glass plate 202, pressure bonding-caused tensile stress due to bending is formed.

In this embodiment, the second glass plate 202 may preferably be a chemically strengthened glass plate. Namely, the glass plate used in this embodiment is not particularly limited, as long as ion exchange can be made. For example, the glass plate may be suitably selected from soda-lime glass, aluminosilicate glass, and so forth, and the selected glass plate may be used.

As an example of the composition of the glass plate used in this embodiment, glass can be considered that has a composition represented in mol % on the oxide basis: 50 to 80% $SiO_2$; 0 to 10% $B_2O_3$; 0.1 to 25% $Al_2O_3$; 3 to 30% $Li_2O+Na_2O+K_2O$; 0 to 25% MgO; 0 to 25% CaO; 0 to 5% SrO; 0 to 5% BaO; 0 to 5% $ZrO_2$; and 0 to 5% $SnO_2$. However, the composition of the glass is not particularly limited. More specifically, the following compositions of the glass can be considered. Note that, for example, "including 0 to 25% MgO" means that MgO is not required; however, MgO may be included up to 25%. (i) Glass that includes, as a composition represented in mol %: 63 to 73% $SiO_2$; 0.1 to 5.2% $Al_2O_3$; 10 to 16% $Na_2O$; 0 to 1.5% $K_2O$; 5 to 13% MgO; and 4 to 10% CaO. (ii) Glass that includes, as a composition represented in mol %, 50 to 74% of $SiO_2$; 1 to 10% of $Al_2O_3$; 6 to 14% of $Na_2O$; 3 to 11% of $K_2O$; 2 to 15% of MgO; 0 to 6% of CaO and 0 to 5% of $ZrO_2$, wherein the total content of $SiO_2$ and $Al_2O_3$ is 75% or less, wherein the total content of $Na_2O$ and $K_2O$ is 12 to 25%, and wherein the total content of MgO and CaO is 7 to 15%. (iii) Glass that includes, as a composition represented in mol %: 68 to 80% $SiO_2$; 4 to 10% $Al_2O_3$; 5 to 15% $Na_2O$; 0 to 1% $K_2O$; 4 to 15% MgO, and 0 to 1% $ZrO_2$. (iv) Glass that includes, as a composition represented in mol %: 67 to 75% $SiO_2$; 0 to 4% $Al_2O_3$; 7 to 15% $Na_2O$; 1 to 9% $K_2O$; 6 to 14% MgO; and 0 to 1.5% $ZrO_2$, wherein the total content of $SiO_2$ and $Al_2O_3$ is 71 to 75%, wherein the total content of $Na_2O$ and $K_2O$ is 12 to 20%, and wherein, if CaO is contained, the content of CaO is less than 1%. (v) Glass that includes, as a composition represented in mol %: 60 to 70% $SiO_2$; 0 to 10% $B_2O_3$; 8 to 15% $Al_2O_3$; 10 to 17% $Na_2O$; 0 to 3% $K_2O$; 0 to 10% MgO; 0 to 1% CaO; and 0 to 1% $ZrO_2$, wherein the total content of $SiO_2$ and $Al_2O_3$ is 76 to 81%, and wherein the total content of $Na_2O$ and $K_2O$ is 13 to 16%.

The second glass plate 202 may preferably be transparent. When the second glass plate 202 is transparent and when the second glass plate 202 is used as a screen for image display, image visibility of passengers can be enhanced. Here, "transparent" means that an amount of transmitting visible light is 80% or more. Since the second plate is transparent, a unique texture may be obtained to appear as if the first glass plate 201 as the first plate were coated with the second glass plate 202, thereby obtaining a laminated plate with a superior design.

The first glass plate 201 preferably has, though not particularly limited thereto, a composition represented in weight percent (wt. %): 65 to 75% $SiO_2$; 0.1 to 5% $Al_2O_3$; 5 to 10% CaO; 2 to 5% MgO; 10 to 15% $Na_2O$; 0 to 3% $K_2O$; 0.2 to 3% $Fe_2O_3$. With the above-described composition, the first glass plate 201 can absorb lower wavelength region in near infrared rays. Thus, the above-described composition is particularly preferred.

The composition of the intermediate film 301 may be a generic composition that can be used for usual laminated glass plate for a vehicle. For example, polyvinyl butyral (PVB) or ethylene vinyl acetal (EVA) can be used. Additionally, a thermosetting resin can be used, which has a liquid state prior to heating. Namely, it suffices if the intermediate film 301 is a solid film after forming the laminated glass plate. Prior to bonding the glass plates, the intermediate film 301 may be in a liquid state.

The intermediate film 301 having a thickness of, for example, 0.5 mm or more and 4 mm or less may preferably be used.

Additionally, the intermediate film 301 formed by mixing an infrared absorbing agent for preventing the temperature elevation on the indoor side may be used. As a material of the infrared absorbing agent, for example, fine particles formed of the following materials are exemplified: metals, oxides, nitrides, sulfides of Sn, Sb, Ti, Si, Zn, Zr, Fe, Al, Cr, Co, Ce, Cs, In, Ni, Ag, Cu, Pt, Mn, Ta, W, V and Mo; and doped materials obtained by doping Sb or F in these materials. These fine particles can be used alone, or used as a composite. Further, a mixture obtained by mixing a single material of these materials or a composite of these materials in an organic resin, or a covered material obtained by coating the single material or the composite materials with organic resin may be used. Further, as the infrared absorbing agents, a coloring agent, a dye, or an organic material (e.g., phthalocyanine, or naphthalocyanine) may be used.

For preventing oscillation by minute vibration, a sound-insulating intermediate film having a small shear elastic modulus may also be used. The sound-insulating intermediate film may be formed by layer-like laminating films each having a different shear elastic modulus. For preventing a double image in the case of using the laminated glass plate for a head-up display, the intermediate film may be a wedge-type intermediate film in which at least a part of the cross section thereof has a wedge shape.

The laminated glass plate 102 for a vehicle of this embodiment has, in a planar view thereof, a peripheral region 313 and an in-plane region 314. Here, the peripheral region 313 is a region of the shaded portion in FIG. 4, and is, for example, a region covering from the periphery 312 of the laminated glass plate 102 for a vehicle to 20 mm in the in-plane direction.

Figure 5:
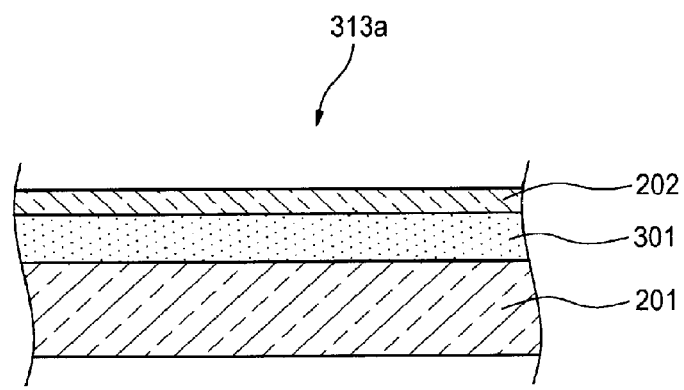
FIG. 5 is a cross-sectional view of a part cut along the I-I line in FIG. 4, and is an enlarged cross-sectional view showing a flat region therein.

The peripheral region 313 includes a flat region and an undulating region. FIG. 5 is a cross-sectional view of a part cut along the I-I line in FIG. 4, and shows a flat region 313a.

Figure 6:
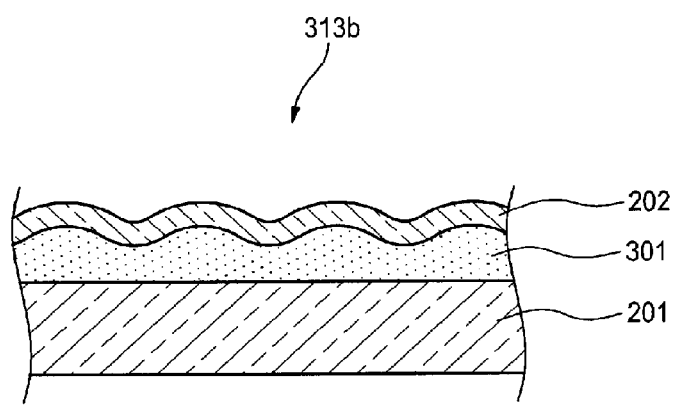
FIG. 6 is a cross-sectional view of a part cut along the II-II line in FIG. 4, and is an enlarged cross-sectional view showing an undulating region therein.

FIG. 6 is a cross-sectional view of a part cut along the II-II line in FIG. 4, and shows an undulating region 313b. In this embodiment, of the peripheral region 313, the region corresponding to the upper edge 104 and the side edges 105 mainly includes the flat region 313a, and the region corresponding to the lower edge 103 mainly includes the undulating region 313b.

The flat region 313a is formed along a part of the outer periphery (including the peripheral region 313) of the laminated plate that is, for example, the laminated glass plate 102 for a vehicle. The flat region 313a is a relatively flat region and is, for example, a region where the standard deviation σ of the thickness of the laminated glass plate 102 for a vehicle (the total thickness of the first glass plate 201, the intermediate film 301 and the second glass plate 202) is less than 0.02 mm. The flat region 313a has, for example, a length of 30 mm or more continuously along the outer periphery of the laminated glass plate 102 for a vehicle.

The standard deviation σ in the flat region 313a may be preferably 0.015 mm or less, more preferably 0.01 mm or less, even more preferably 0.008 mm or less. When the standard deviation σ in the flat region 313a is small, the problems of function, strength and appearance quality in the flat region 313a can be solved more favorably.

In the laminated glass plate 102 for a vehicle of this embodiment, the outer periphery thereof is formed of plural edges, and the plural edges include an arbitrary first edge. The first edge may be a linear or arc-like one. In that manner, in the case where the laminated plate has an arbitrary first edge, for example, the flat region 313a is formed along a part of the first edge. In this case, the flat region 313a has, for example, a length of 30 mm or more continuously in the direction along the first edge. Needless to say, the flat region 313a may be formed along entirely the first edge. In this embodiment, the first edge is, when the laminated glass plate 102 for a vehicle is assembled in a vehicle body, to be the upper edge 104 as an exposed edge that is exposed outside, and is to be the side edge 105 as a slide edge that is to slide.

For the thickness of the laminated glass plate 102 for a vehicle, the thickness thereof in the area inside by 5 mm from the periphery 312 is measured along the periphery (outer periphery) 312 at intervals of predetermined length L (for example 5 mm). From this, the standard deviation σ of the thickness per the predetermined length L can be calculated. FIG. 4 illustrates an example of measuring the thickness from a predetermined position α near the corner edge A at intervals of the predetermined length L. However, the position from which the measurement is started is not specifically limited.

According to the experiments of the present inventors, the wavelength λ of the undulation in the undulating region is 30 mm to 50 mm, and therefore the standard deviation σ of the thickness is, for example, the standard deviation of a group of values measured in 6 to 10 points continuously at intervals of 5 mm.

The undulating region 313b is formed along a part of the outer periphery (including the peripheral region 313) of the laminated plate that is, for example, the laminated glass plate 102 for a vehicle. The undulating region 313b is a region relatively rich in undulations (asperities) and is, for example, a region where the standard deviation a of the thickness of the laminated glass plate 102 for a vehicle (the total thickness of the first glass plate 201, the intermediate film 301 and the second glass plate 202) is 0.02 mm or more. The undulating region 313b has, for example, a length of 30 mm or more continuously along the outer periphery of the laminated glass plate 102 for a vehicle.

The standard deviation σ in the undulating region may be preferably 0.025 mm or more, more preferably 0.03 mm or more, even more preferably 0.038 mm or more. When the standard deviation σ in the undulating region 313*b* is large, the flat region 313*a* may be easy to form in the peripheral region 313 except the undulating region 313*b*.

In the laminated glass plate 102 for a vehicle of this embodiment, the outer periphery thereof is formed of plural edges, and the plural edges include an arbitrary second edge. The second edge differs from the first edge, and may be a linear or arc-like one. In that manner, in the case where the laminated plate has an arbitrary second edge, for example, the undulating region 313*b* is formed along a part of the second edge. In this case, the undulating region 313*b* has, for example, a length of 30 mm or more continuously in the direction along the second edge. Needless to say, the undulating region 313*b* may be formed along entirely the second edge. In this embodiment, the second edge is, when the laminated glass plate 102 for a vehicle is assembled in a vehicle body, to be lower upper edge 103 as a non-exposed edge that is not exposed outside.

In some cases of the laminated glass plate 102 for a vehicle, a black ceramic coat (ceramic coating) may be provided in at least a part of the peripheral region 313, thereby providing therein a light-shielding region to block out light. The light-shielding part is a part where light transmission is blocked out, and is not required to have high transparency and appearance quality. In this case, the laminated glass plate is so produced that at least a part of the undulating region 313*b* exists in the light-shielding region.

In some cases of the laminated glass plate 102 for a vehicle, at least a part of the peripheral region 313 may be provided with a mole. The mole plays, when glass is fixed to a vehicle flange, a role of a sealant that hold the glass and seals up the gap between the glass and the vehicle flange. Of the peripheral region 313, the region equipped with a mole is also a light-shielding region where light transmission is blocked out, and is therefore not required to have high transparency and appearance quality. In this case, the laminated glass plate is so produced that at least a part of the undulating region 313*b* exists in the light-shielding region.

In producing the laminated plate such as the laminated glass plate 102 for a vehicle of this embodiment, a thin second plate (second glass plate 202) is attached to a thick first plate (first glass plate 201) via the intermediate film 301. In this process, wrinkles may often form entirely along the outer periphery of the thin second plate, and as a result, wrinkles may often remain entirely in the outer periphery of the produced laminated plate. In this case, there is a high possibility that various problems may occur in point of the function, the strength and the appearance quality of the laminated plate.

On the other hand, as described above, for example, in the outer periphery including the upper edge 104, the side edges 105 and the lower edge 103 of the laminated glass plate 102 for a vehicle, the respective regions differ from each other in point of the level of the necessary function such as transparency, the strength and the appearance quality. Accordingly, in this embodiment, the part of the upper edge (exposed edge) 104 and the part of the side edges (slide edges) 105 are formed mainly of a flat region 313*a* to thereby satisfy the transparency, the strength and the appearance quality on a predetermined level or more. On the other hand, the part of the lower edge (non-exposed edge) 107 is not so much required to have transparency, strength and appearance quality as compared with the upper edge 104 and the side edges 105, and therefore in this part, the wrinkles to be generated in the second glass plate 202 are particularly focused and, as a result, the lower edge (non-exposed edge) 103 is formed mainly of an undulating region 313*b*. Accordingly, there can be provided a laminated plate capable of solving the problems of function, strength, appearance quality, etc.

One example of a production apparatus for the laminated glass plate 102 for a vehicle of this embodiment is described below. First, a first glass plate 201 is formed so as to have a first curved shape. The bending forming for the first glass plate 201 may be carried out according to any conventional press forming, gravity forming or the like method. Subsequently, an intermediate film 301 cut in a suitable shape is positioned and put on the first glass plate 201. Further, a second glass plate 202 having a second shape (including a non-shaped plate-like form) is positioned and put on the intermediate film 301. The periphery of the resultant uncompressed laminate is temporarily fixed at some points with a tape or the like. The temporary taping may be in a dot-like or linear mode. For example, the edge that is to be the upper edge 104 when the laminated glass plate is used as a windowpane for a vehicle may be temporarily taped in a linear mode, while the edge that is to be the lower edge 103 when used as a windowpane for a vehicle may be dot-like temporarily taped so as to form a non-taped area.

Next, the temporarily-fixed laminated glass plate for a vehicle that has been prepared in the manner as above is, while heated, made to run through a pair of pressure rollers for preliminary pressure bonding. The pair of pressure rollers are so designed that the distance between the rollers is smaller than the thickness of the temporarily-fixed laminated glass plate for a vehicle. Accordingly, while the temporarily-fixed laminated glass plate for a vehicle is made to run through the pressure rollers, the first glass plate 201 and the second glass plate 202 are pressed against each other. As a result, the air existing inside the temporarily-fixed laminated glass plate for a vehicle is thereby extruded out to give a preliminary-bonded glass plate.

At this time, the temporarily-fixed laminated glass plate for a vehicle is made to run through the pair of pressure rollers in an order of the upper edge 104→the side edges 105→the lower edge 103, whereby the wrinkled parts in the second glass plate 202 are gathered in the part corresponding to the lower edge 103. As a result, as shown in FIG. 1 and FIG. 4, the undulating region 313*b* may be formed mainly in the region of the lower edge 103.

Alternatively, the temporarily-fixed laminated glass plate for a vehicle may be put in a rubber bag and pressurized by degassing for preliminary pressure bonding.

Subsequently, the preliminary-bonded laminated glass plate for a vehicle is finally pressure-bonded in an autoclave to give the laminated glass plate 102 for a vehicle.

Figure 7:
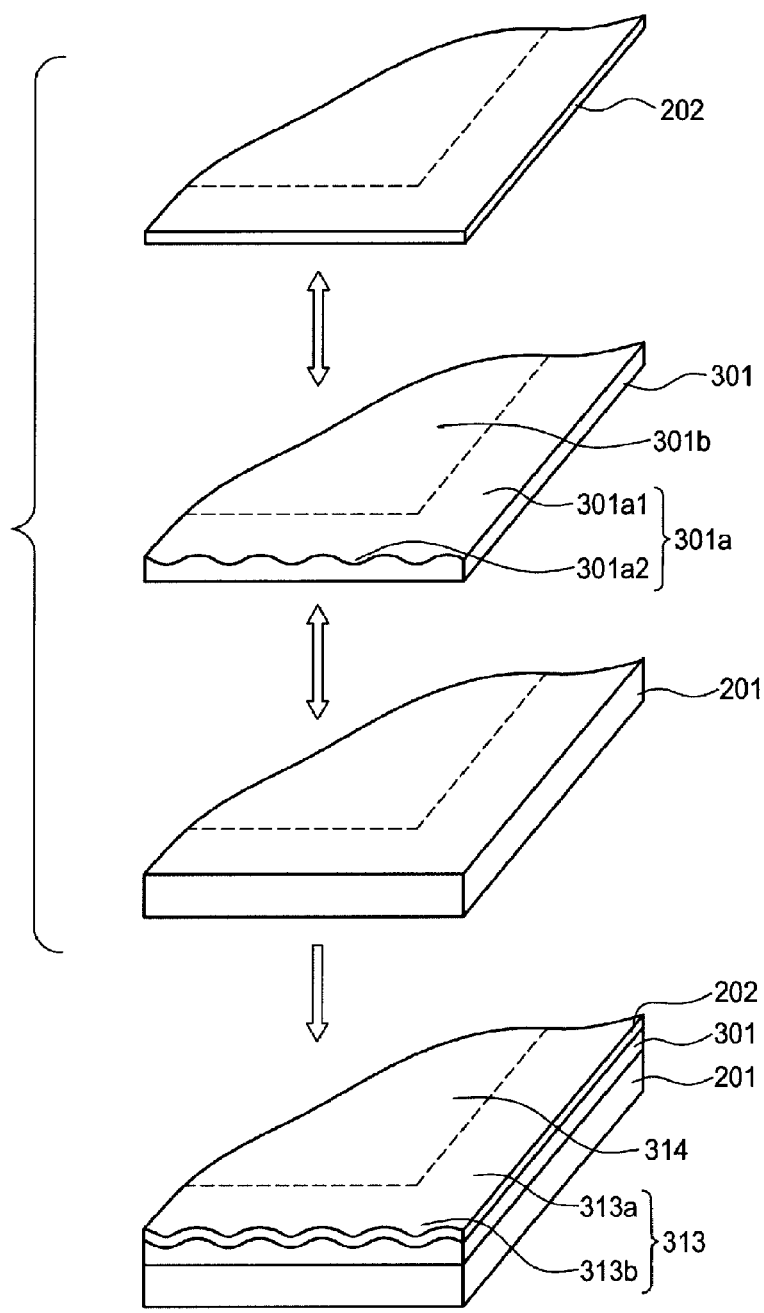
FIG. 7 is a conceptual diagram showing a method for producing a laminated glass plate for a vehicle.

FIG. 7 is a conceptual diagram showing another production method for the laminated glass plate 102 for a vehicle. This drawing shows only a corner edge of the laminated glass plate 102 for a vehicle. The intermediate film 301 used in this production method has, in a planar view thereof, a peripheral region 301*a* outside the dotted line and an in-plane region 301*b* inside the dotted line, and a flat region 301*a*1 and an undulating region 301*a*2 are previously provided in the peripheral region 301*a*. Using the intermediate film 301 in which the peripheral region 301*a* has, as previously formed therein, the flat region 301*a*1 and the undulating region 301*a*2, the laminated glass plate 102 for a vehicle that has a flat region 313*a* and an undulating region 313*b* in a peripheral region 313 outside the dotted line can be produced with ease. A first glass plate 201, an intermediate film 301 and a second glass plate 202 are stacked and processed for the above-mentioned temporary fixation, and using the above-mentioned pressure rollers or rubber bag, the laminated glass plate 102 for a vehicle can be produced. In particular, along the undulating region 301a2 of the intermediate film 301, the second glass plate 202 can deform in the process of preliminary pressure bonding, and therefore, the wrinkles to be generated in the second glass plate 202 can be intentionally focused in the position corresponding to the undulating region 301a2.

Figure 8:
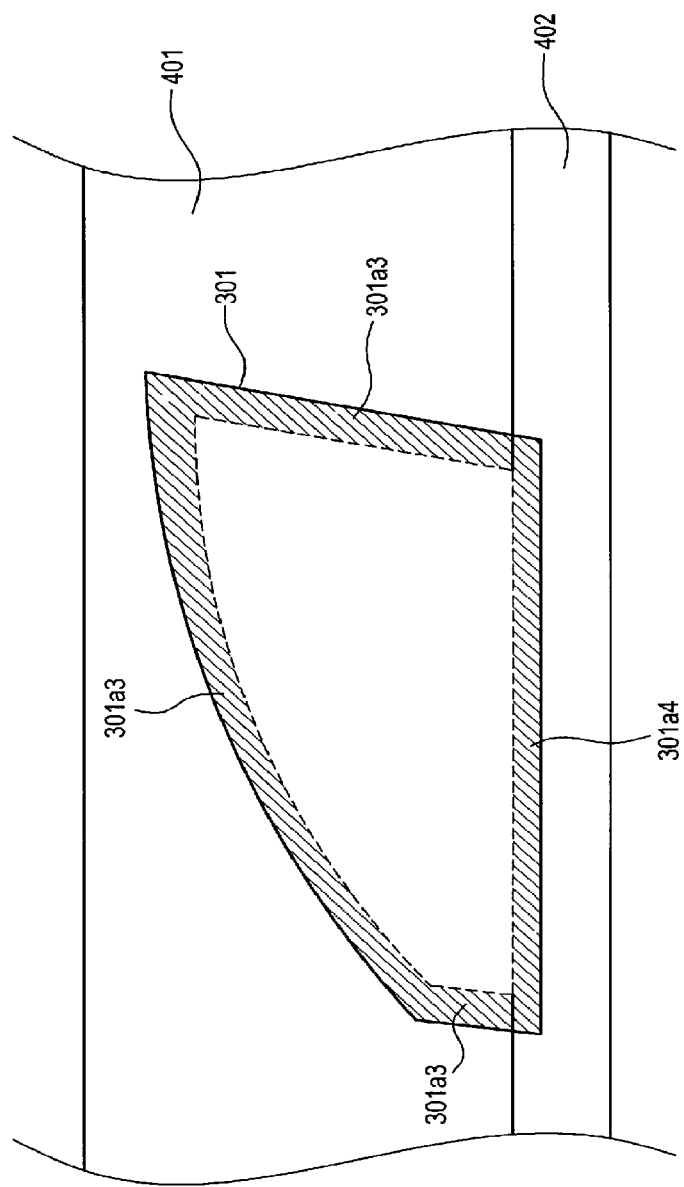
FIG. 8 is a conceptual diagram showing a method for producing an intermediate film for a laminated glass plate for a vehicle.

FIG. 8 is a conceptual diagram showing a method for producing an intermediate film for the laminated glass plate 102 for a vehicle. The intermediate film 301 to be produced according to this production method has, in a planar view thereof, a peripheral region 301a and an in-plane region 301b, and the peripheral region includes a hard region 301a3 and a soft region 301a4. In producing the intermediate film 301, first, a hard resin plate 401 formed of a hard resin and a soft resin plate 402 formed of a soft resin are prepared, and while these plates are kept bonded to each other, the intermediate film 301 is stamped out so as to extend over the two plates, using a predetermined die or the like. Using the intermediate film 301 having, as previously formed therein, the hard region 301a3 and the soft region 301a4 and according to the above-mentioned temporary fixation, and using the above-mentioned pressure rollers or rubber bag, the laminated glass plate 102 for a vehicle can be produced. In particular, by leading the temporarily-fixed laminated glass plate for a vehicle to pass through the pair of pressure rollers in an order of the upper edge 104→the side edges 105→the lower edge 103, wrinkles can be readily formed in the second glass plate 202 in the part thereof corresponding to the lower edge 103, owing to the difference in the hardness between the hard resin and the soft resin. As a result, the undulating region 313b can be formed mainly in the region of the lower edge 103, as shown in FIG. 1 and FIG. 4.

Similarly in FIG. 7, the flat region plate including the flat region 301a1 and the undulating region plate including the undulating region 301a2 may be prepared, and while these plates are kept bonded to each other, the intermediate film 301 may be stamped out to extend over the two plates, using a predetermined die or the like. In that manner, the intermediate film 301 having, as previously formed therein, the flat region 301a1 and the undulating region 301a2 can be obtained.

Figure 9:
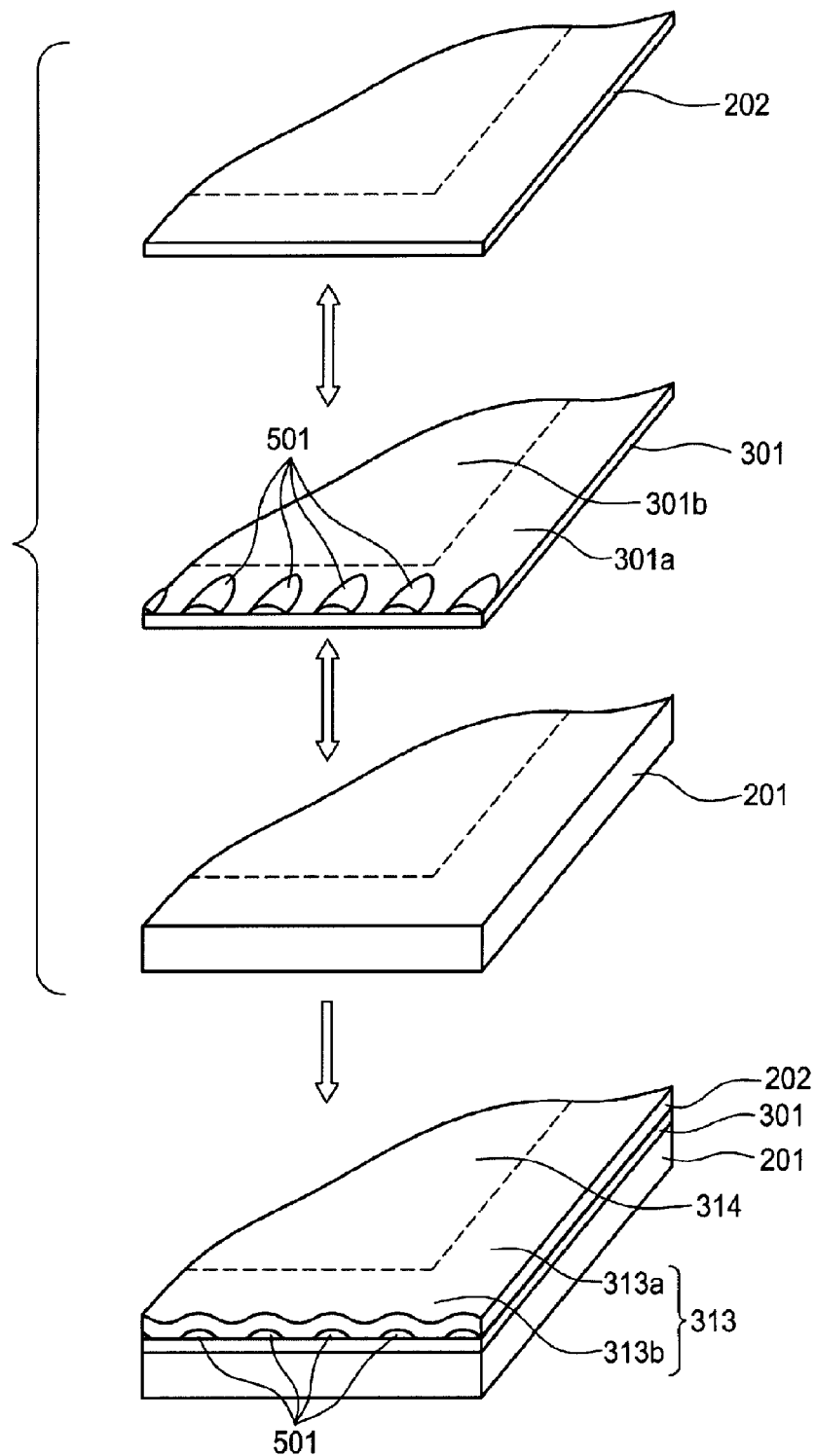
FIG. 9 is a conceptual diagram showing a method for producing a laminated glass plate for a vehicle.

FIG. 9 is a conceptual diagram showing a still another production method for the laminated glass plate 102 for a vehicle. This drawing shows only a corner edge of the laminated glass plate 102 for a vehicle. Different from that in the case of FIG. 7, the intermediate film 301 used in this production method does not have two regions of a flat region and an undulating region in the peripheral region 301a outside the dotted line. Plural spacers 501 formed of a resin, a metal or the like are arranged partly in the peripheral region 301a of the intermediate film 301. With the plural spacers 501 kept arranged on the intermediate film 301 and using the above-mentioned production apparatus, a temporarily-fixed laminated glass plate for a vehicle is produced. By leading the temporarily-fixed laminated glass plate for a vehicle to pass through the pair of pressure rollers in an order of the upper edge 104→the side edges 105→the lower edge 103, wrinkled parts can be readily formed in the second glass plate 202 in the part thereof corresponding to the lower edge 103, owing to the existence of the spacers 501. As a result, the undulating region 313b can be formed mainly in the region of the lower edge 103, as shown in FIG. 1 and FIG. 4. The spacers 501 can be utilized as members having a predetermined function such as electrodes for voltage application, harnesses, etc.

According to the production methods shown in FIG. 7 to FIG. 9, wrinkles to be generated in the second glass plate 202 can be intentionally focused, for example, in the part of the lower edge 103 not required to have high transparency, strength and appearance quality. With that, as a result, the lower edge 103 is formed mainly of the undulating region 313b. Consequently, it has become possible to produce a laminated plate capable of solving the problems of function, strength and appearance quality.

The laminated plate (laminated glass plate 102 for a vehicle) of this embodiment is a laminated plate including a first plate (first glass plate 201) being curved in a first curved shape, a second plate (second glass plate 202) having a second shape that is different from the first curved shape, and an intermediate film 301 bonding the first plate and the second plate. Here, the laminated plate has, in a planar view thereof, a peripheral region 313 and an in-plane region 314, in which the peripheral region 313 has a flat region 313a and an undulating region 313b. Accordingly, there can be provided a laminated plate capable of solving the problems of function, strength and appearance quality.

For example, the flat region 313a is formed along a part of the outer periphery of the laminated plate. Accordingly, the flat region 313a can be formed easily, and a laminated plate capable of solving the problems of function, strength and appearance quality can be provided.

For example, the flat region 313a has a length of 30 mm or more continuously along the outer periphery. Accordingly, a laminated plate capable of solving more favorably the problems of function, strength and appearance quality can be provided.

For example, the flat region 313a is formed along a part of the first edge of the laminated plate. Accordingly, the flat region 313a can be formed easily, and a laminated plate capable of solving the problems of function, strength and appearance quality can be provided.

For example, the flat region 313a has a length of 30 mm or more continuously in the direction along the first edge (the upper edge 104, the side edges 105). Accordingly, a laminated plate capable of solving more favorably the problems of function, strength and appearance quality can be provided.

For example, the flat region 313a is formed entirely along the first edge (the upper edge 104, the side edges 105) of the laminated plate. Accordingly, a laminated plate capable of solving more favorably the problems of function, strength and appearance quality can be provided.

For example, the laminated plate is a windowpane for a vehicle (the laminated glass plate 102 for a vehicle), in which the first edge (the upper edge 104) is an exposed edge that is exposed outside when the laminated plate is assembled in a vehicle body. With that, wrinkles to be generated in the second glass plate 202 can be made intentionally not to form at the first edge. Accordingly, a laminated plate capable of solving the problems of function, strength and appearance quality can be provided.

For example, the laminated plate is a slidable windowpane for a vehicle (the laminated glass plate 102 for a vehicle), in which the first edge (the side edges 105) is a slide edge that slides when the laminated plate is assembled in a vehicle body. Accordingly, a laminated plate capable of solving the problems of function, strength and appearance quality can be provided.

For example, the standard deviation of the thickness in the flat region 313a is less than 0.02 mm. Accordingly, a laminated plate capable of effectively solving the problems of function, strength and appearance quality can be provided.

For example, the undulating region 313b is a region having a length of 30 mm or more continuously in the direction along the second edge (the lower edge 103) of the laminated plate. With that, wrinkles to be generated in the second glass plate 202 can be made intentionally to form at the second edge, thereby forming the undulating region 313b in the region of the second edge. Accordingly, a laminated plate capable of solving the problems of function, strength and appearance quality can be provided.

For example, the undulating region 313b is formed entirely along the second edge (the lower edge 103) of the laminated plate. Accordingly, a laminated plate capable of effectively solving the problems of function, strength and appearance quality can be provided.

For example, the peripheral region 313 has a light-shielding region, and at least a part of the undulating region 313b exists in the light-shielding region. With that, wrinkles to be generated in the second glass plate 202 can be intentionally focused in the light-shielding region not required to have high function and appearance quality, and accordingly, a laminated plate capable of effectively solving the problems of function, strength and appearance quality can be provided.

For example, the laminated plate is a windowpane for a vehicle (the laminated glass plate 102 for a vehicle), in which the second edge (the lower edge 103) is a non-exposed edge that is not exposed outside when the laminated plate is assembled in a vehicle body. Accordingly, a laminated plate capable of solving the problems of function, strength and appearance quality can be provided.

For example, the standard deviation of the thickness in the undulating region 313b is 0.02 mm or more. Accordingly, a laminated plate capable of effectively solving the problems of function, strength and appearance quality can be provided.

The intermediate film 301 of this embodiment bonds a first plate (the first glass plate 201) being curved in a first curved shape and a second plate (second glass plate 202) having a second shape that is different from the first curved shape to each other. The intermediate film 301 has, in a planar view thereof, a peripheral region 301a and an in-plane region 301b, and the peripheral region 301a includes a flat region 301a1 and an undulating region 301a2. With that, in production of the laminated plate, wrinkles to be generated in the second glass plate 202 can be intentionally focused at the position corresponding to the undulating region 301a2, and accordingly, there can be provided the intermediate film 301 for producing a laminated plate capable of solving the problems of function, strength and appearance quality.

The intermediate film 301 of this embodiment has, in a planar view thereof, a peripheral region 301a and an in-plane region 301b, and the peripheral region 301a has a hard region 301a3 and a soft region 301a4. With that, in production of the laminated plate, wrinkles to be generated in the second glass plate 202 can be intentionally focused at the position corresponding to the soft region 301a4, and accordingly, there can be provided the intermediate film 301 for producing a laminated plate capable of solving the problems of function, strength and appearance quality.

The present invention is not limited to the above-mentioned embodiment and may be suitably modified and changed. In addition, the material, the shape, the dimension, the numerical value, the morphology, the number and the site for arrangement of the constituent element etc. in this embodiment mentioned above can be any arbitrary ones with no limitation thereon so far as they can attain the present invention.

The present application is based on Japanese Patent Application No. 2015-157684 filed on Aug. 7, 2015 and Japanese Patent Application No. 2016-137764 filed on Jul. 12, 2016, and the contents are incorporated herein by reference.

The present invention relates to a laminated plate, and is especially favorably used as a laminated glass plate for vehicle side doors capable of sliding vertically, a fixed windowpane, a laminated plate formed by bonding resin plates such as polycarbonate, a laminated plate formed of a combination of a pillar of a body of a vehicle and a style strip that is laminated on the pillar, so that the style strip covers the pillar, a cover glass for an electronic instrument, etc.

DESCRIPTION OF REFERENCE NUMERALS AND SIGNS

102 Laminated Glass Plate for Vehicle (laminated plate)
103 Lower Edge (non-exposed edge, second edge)
104 Upper Edge (exposed edge, first edge)
105 Side Edge (slide edge, first edge)
120 Elevator
121, 122 Arm
123 Elevation Rail
124 Fixed Rail
125 Fulcrum
126 Gear
127 Holder
130 Window Frame
131 Glass Run
201 First Glass Plate (first plate)
202 Second Glass Plate (second plate)
301 Intermediate Film
312 Periphery
313 Peripheral Region
313a Flat Region
313b Undulating Region
314 In-plane Region
501 Spacer
A, B, C, D Corner Edge

What is claimed is:
1. A laminated plate comprising:
a first glass plate having a first curved shape bonded to a second glass plate having a second shape with an intermediate film, the second shape being different from the first curved shape
such that the laminated plate has, in a planar view thereof, an in-plane region and an outer peripheral region to the in-plane region;
wherein
a thickness of the first glass plate is greater than a thickness of the second glass plate,
the thickness of the first glass plate is 1.5 mm or more and 4.0 mm or less, and
the thickness of the second glass plate is 0.2 mm or more and less than 1.0 mm, and
the peripheral region has a flat region and an undulating region, the undulating region comprising wrinkles formed in the second glass plate.

2. The laminated plate according to claim 1, wherein the flat region is formed along a part of an outer periphery of the laminated plate.

3. The laminated plate according to claim 1, wherein:
an outer periphery of the laminated plate is formed of plural edges,
the plural edges include a first edge, and
the flat region is formed along a part of the first edge of the laminated plate.

4. The laminated plate according to claim 1, wherein:
an outer periphery of the laminated plate is formed of plural edges,
the plural edges include a first edge, and
the flat region is formed entirely along the first edge of the laminated plate.

5. The laminated plate according to claim 3, wherein:
the laminated plate is a windowpane for a vehicle, and
the first edge is an exposed edge that is exposed outside when the laminated plate is assembled in a vehicle body.

6. The laminated plate according to claim 4, wherein:
the laminated plate is a windowpane for a vehicle, and
the first edge is an exposed edge that is exposed outside when the laminated plate is assembled in a vehicle body.

7. The laminated plate according to claim 3, wherein:
the laminated plate is a slidable windowpane for a vehicle, and
the first edge is a slide edge that slides when the laminated plate is assembled in a vehicle body.

8. The laminated plate according to claim 4, wherein:
the laminated plate is a slidable windowpane for a vehicle, and
the first edge is a slide edge that slides when the laminated plate is assembled in a vehicle body.

9. The laminated plate according to claim 1, wherein a standard deviation of a thickness in the flat region is less than 0.02 mm.

10. The laminated plate according to claim 1, wherein the undulating region is formed along a part of the outer periphery of the laminated plate.

11. The laminated plate according to claim 1, wherein:
the outer periphery of the laminated plate is formed of plural edges,
the plural edges include a second edge, and
the undulating region is formed along a part of the second edge of the laminated plate.

12. The laminated plate according to claim 1, wherein:
the outer periphery of the laminated plate is formed of plural edges,
the plural edges include a second edge, and
the undulating region is a region having a length of 30 mm or more continuously in a direction along the second edge of the laminated plate.

13. The laminated plate according to claim 1, wherein:
the peripheral region has a light-shielding region, and
at least a part of the undulating region exists in the light-shielding region.

14. The laminated plate according to claim 11, wherein:
the laminated plate is a windowpane for a vehicle, and
the second edge is a non-exposed edge that is not exposed outside when the laminated plate is assembled in a vehicle body.

15. The laminated plate according to claim 12, wherein:
the laminated plate is a windowpane for a vehicle, and
the second edge is a non-exposed edge that is not exposed outside when the laminated plate is assembled in a vehicle body.

16. The laminated plate according to claim 1, wherein a standard deviation of a thickness in the undulating region is 0.02 mm or more.

* * * * *

UNITED STATES PATENT AND TRADEMARK OFFICE
CERTIFICATE OF CORRECTION

PATENT NO. : 10,328,656 B2
APPLICATION NO. : 15/228605
DATED : June 25, 2019
INVENTOR(S) : Keiji Notsu et al.

Page 1 of 1

It is certified that error appears in the above-identified patent and that said Letters Patent is hereby corrected as shown below:

On the Title Page

Item (30), the Foreign Application Priority Data has been omitted. Item (30) should read:
--(30)  Foreign Application Priority Data
Aug. 7, 2015    (JP) ........................ 2015-157684
Jul. 12, 2016    (JP) ........................ 2016-137764--

Signed and Sealed this
Twenty-eighth Day of April, 2020

Andrei Iancu
*Director of the United States Patent and Trademark Office*